(12) United States Patent
Yen et al.

(10) Patent No.: US 10,464,303 B2
(45) Date of Patent: Nov. 5, 2019

(54) THREE-DIMENSIONAL PRINTING APPARATUS

(71) Applicants: XYZprinting, Inc., New Taipei (TW); Kinpo Electronics, Inc., New Taipei (TW)

(72) Inventors: Chao-Yu Yen, New Taipei (TW); Chen-Fu Huang, New Taipei (TW); An-Hsiu Lee, New Taipei (TW); Tsai-Yi Lin, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 255 days.

(21) Appl. No.: 15/406,796

(22) Filed: Jan. 16, 2017

(65) Prior Publication Data
US 2018/0133978 A1    May 17, 2018

(30) Foreign Application Priority Data

Nov. 17, 2016  (CN) .......................... 2016 1 1010556

(51) Int. Cl.
*B29C 67/00*    (2017.01)
*B33Y 30/00*    (2015.01)
(Continued)

(52) U.S. Cl.
CPC ............ *B33Y 40/00* (2014.12); *B29C 64/124* (2017.08); *B29C 64/129* (2017.08);
(Continued)

(58) Field of Classification Search
CPC ... B29C 64/106; B29C 64/135; B29C 64/124; B29C 64/20; B29C 64/264; B29C 64/153; B33Y 10/00; B33Y 30/00; B33Y 50/02
See application file for complete search history.

(56) References Cited

U.S. PATENT DOCUMENTS

| 2014/0265034 A1* | 9/2014 | Dudley | B33Y 10/00 |
| | | | 264/401 |
| 2014/0339741 A1* | 11/2014 | Aghababaie | B29C 64/20 |
| | | | 264/401 |

(Continued)

FOREIGN PATENT DOCUMENTS

| CN | 105196536 | 12/2015 |
| CN | 105619648 | 6/2016 |

(Continued)

OTHER PUBLICATIONS

"Search Report of Europe Counterpart Application", dated Nov. 30, 2017, p. 1-p. 8.

(Continued)

*Primary Examiner* — Joseph S Del Sole
*Assistant Examiner* — Mohamed K Ahmed Ali
(74) *Attorney, Agent, or Firm* — JCIPRNET

(57) ABSTRACT

A three-dimensional printing apparatus including a body, a rotation module, a tank, an elevating module, a forming platform, a curing module, and a control module is provided. The rotation module and the elevating module are disposed on the body. The tank is disposed on the rotation module. The forming platform is disposed on the elevating module. The curing module disposed in the body and under the tank. The control module is electrically connected to the rotation module, the elevating module, and the curing module. The forming platform dips into the forming material in liquid in the tank and the curing module cures the forming material between the forming platform and an inner bottom of the tank to form a solidification layer. Then the elevating module and the rotation module respectively drive the forming platform to rise and rotate relatively to the tank simultaneously.

8 Claims, 4 Drawing Sheets

(51) Int. Cl.
    *B33Y 40/00*       (2015.01)
    *B33Y 50/02*       (2015.01)
    *B33Y 10/00*       (2015.01)
    *B29C 64/124*      (2017.01)
    *B29C 64/255*      (2017.01)
    *B29C 64/129*      (2017.01)
    *B29C 64/386*      (2017.01)
    *B29K 105/00*      (2006.01)

(52) U.S. Cl.
    CPC .......... *B29C 64/255* (2017.08); *B29C 64/386* (2017.08); *B33Y 10/00* (2014.12); *B33Y 30/00* (2014.12); *B33Y 50/02* (2014.12); *B29K 2105/0058* (2013.01)

(56) References Cited

U.S. PATENT DOCUMENTS

2015/0224710 A1\*  8/2015  El-Siblani .............. B33Y 70/00
                                                    264/401
2016/0016361 A1    1/2016  Lobovsky et al.

FOREIGN PATENT DOCUMENTS

EP        0376571        7/1990
GB        2514139        11/2014

OTHER PUBLICATIONS

"Office Action of China Counterpart Application", dated Jul. 17, 2019, p1-p8.

\* cited by examiner

THREE-DIMENSIONAL PRINTING APPARATUS

CROSS-REFERENCE TO RELATED APPLICATION

This application claims the priority benefit of China patent application serial no. 201611010556.4, filed on Nov. 17, 2016. The entirety of the above-mentioned patent application is hereby incorporated by reference herein and made a part of the specification.

BACKGROUND

Technical Field

The disclosure relates to a three-dimensional printing apparatus.

Description of Related Art

As technology advanced in the recent years, many methods that utilize additive manufacturing technology (e.g., layer-by-layer model construction) to build three-dimensional (3D) physical models have been proposed. Generally speaking, the additive manufacturing technology involves converting design data of a 3D model, which is constructed by software, such as computer aided design (CAD), into multiple thin (quasi-two-dimensional) cross-sectional layers that are stacked in sequence.

Currently, many techniques for forming a plurality of thin cross-sectional layers have been developed. For example, a movement platform is disposed in a forming material in liquid, and a light source is driven to irradiate on the forming material in liquid along X-Y coordinates according to X-Y-Z coordinates constructed according to the design data of the 3D model, thereby curing the forming material in liquid into correct shapes of the cross-sectional layers. Next, as the movement platform moves along a Z axis, the forming material in liquid forms a three-dimensional article in a state of layer-by-layer curing and stacking.

SUMMARY

The disclosure provides a three-dimensional printing apparatus having a simple solidification layer peeling structure for enhancing three-dimensional printing efficiency.

A three-dimensional printing apparatus of the disclosure includes a body, a rotation module, a tank, an elevating module, a forming platform, a curing module, and a control module. The rotation module and the elevating module are disposed on the body. The tank is disposed on the rotation module. The forming platform is disposed on the elevating module. The curing module is disposed in the body and is located under the tank. The control module is electrically connected to the rotation module, the elevating module, and the curing module to drive the forming platform to dip into a forming material in liquid in the tank and drive the curing module to cure the forming material in liquid between the forming platform and an inner bottom of the tank to form a solidification layer, and then drive the forming platform through the elevating module to rise relatively to the tank and simultaneously drive the tank to rotate through the rotation module to peel the solidification layer off the inner bottom of the tank and form on the forming platform.

In light of the above, through the combination of the rotation module and the elevating module of the three-dimensional printing apparatus, the forming platform and the tank generate different actions that correspond to each other. When the solidification layer is to be peeled off, the forming platform is elevated relatively to the inner bottom of the tank, and the tank is simultaneously rotated, such that the solidification layer can be smoothly peeled off the inner bottom of the tank through the combination of a shear force and a tensile stress and can be formed on the forming platform. Through configuring different action modes respectively for the forming platform and the tank, a component movement time in the three-dimensional printing processing can be effectively reduced, and efficiency of the overall manufacturing process is enhanced.

To provide a further understanding of the aforementioned and other features and advantages of the disclosure, exemplary embodiments, together with the reference drawings, are described in detail below.

DESCRIPTION OF THE EMBODIMENTS

Figure 1:
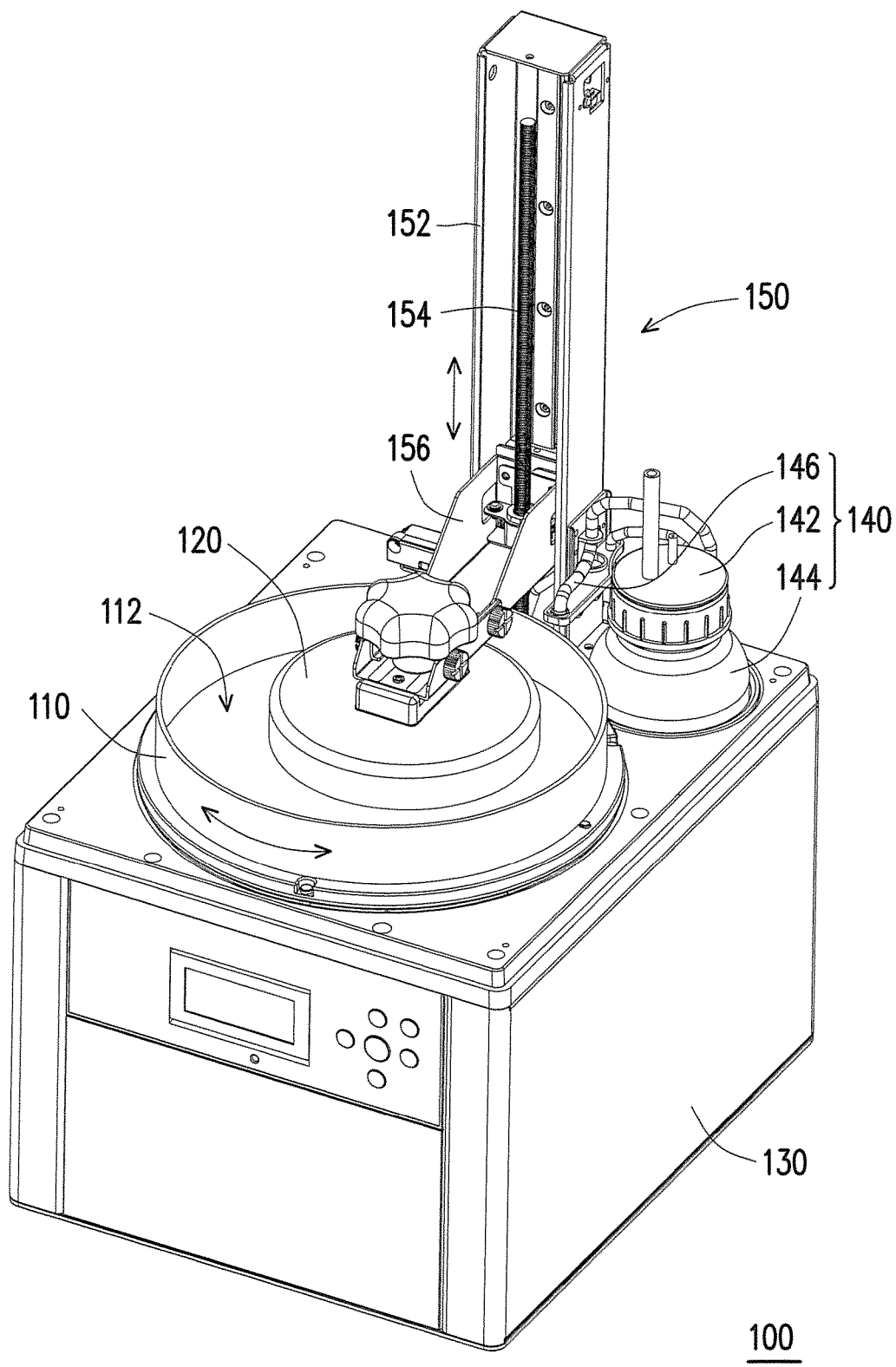
FIG. 1 is a schematic diagram illustrating a three-dimensional printing apparatus according to one embodiment of the disclosure.
Figure 2:
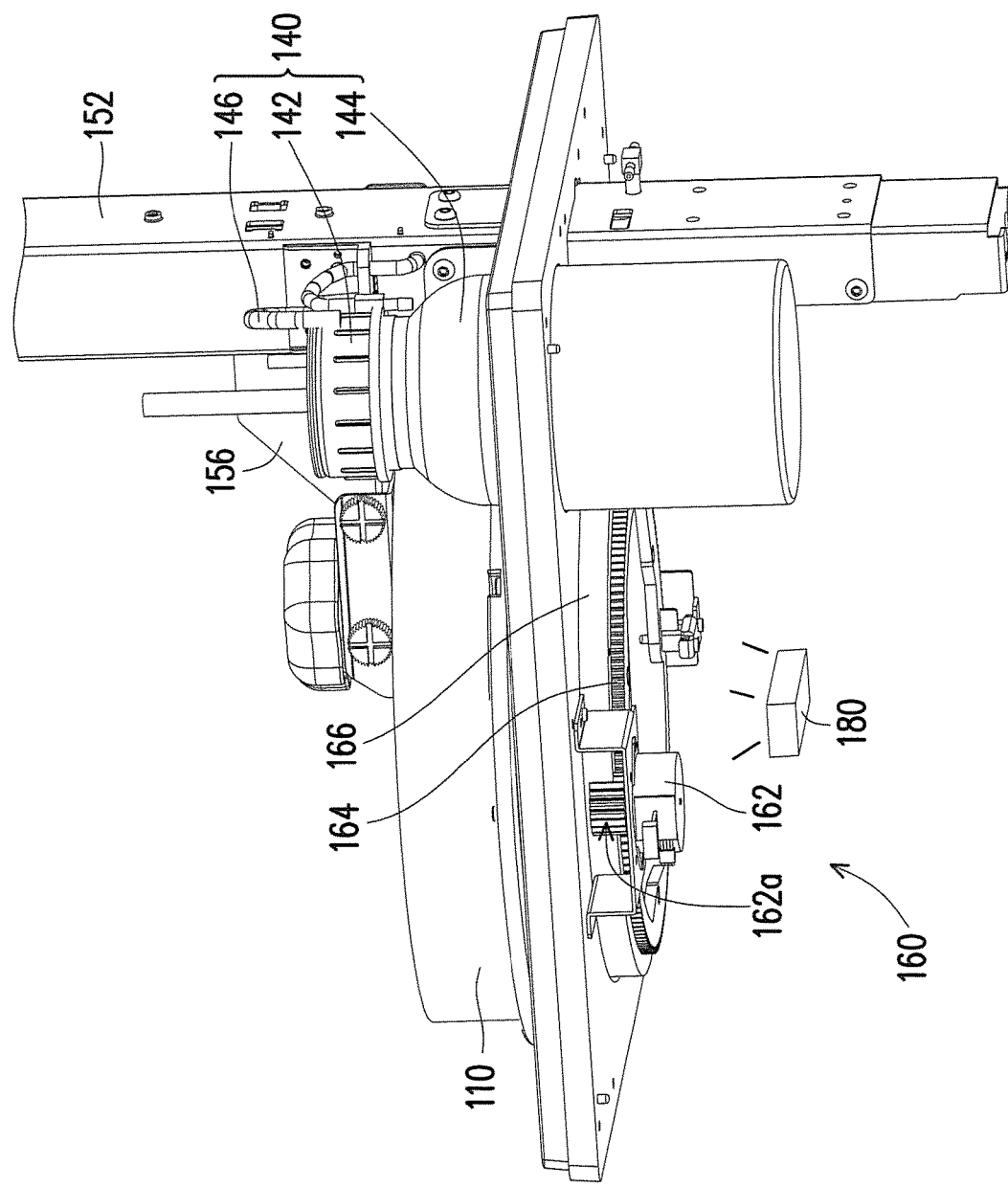
FIG. 2 is a schematic diagram illustrating part of components of the three-dimensional printing apparatus of FIG. 1 from another angle of view.
Figure 3:
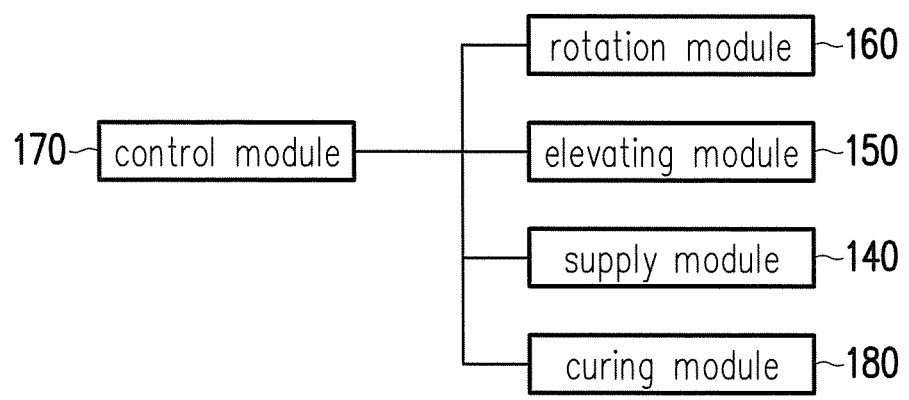
FIG. 3 is a schematic diagram illustrating electrical connections of relevant components of the three-dimensional printing apparatus of FIG. 1.

FIG. 1 is a schematic diagram illustrating a three-dimensional printing apparatus according to one embodiment of the disclosure. FIG. 2 is a schematic diagram illustrating part of components of the three-dimensional printing apparatus of FIG. 1 from another angle of view. FIG. 3 is a schematic diagram illustrating electrical connections of relevant components of the three-dimensional printing apparatus of FIG. 1. Referring to FIG. 1 to FIG. 3 at the same time, in the present embodiment, a three-dimensional printing apparatus 100 is, for example, a stereo lithography (SL) apparatus or a digital light processing (DLP) apparatus, which includes a body 130, a rotation module 160, a tank 110, an elevating module 150, a forming platform 120, a curing module 180, and a control module 170. The rotation module 160 and the elevating module 150 are disposed on the body 130. The tank 110 is disposed on the rotation module 160 and an inner bottom 112 of the tank 110 is a plane. The forming platform 120 is disposed on the elevating module 150. The curing module 180 is disposed in the body 130 and is located under the tank 110. The control module 170 is electrically connected to the rotation module 160, the elevating module 150, and the curing module 180.

Moreover, the three-dimensional printing apparatus 100 further includes a supply module 140 containing a forming material in liquid (not illustrated) therein. The supply module 140 is disposed on the body 130 and is located beside the tank 110 for injecting the forming material in liquid into the tank 110 as supply in a process of three-dimensional printing. In addition, although the drawings of the disclosure illustrate an area of the forming platform smaller than an area of the inner bottom 112 of the tank 110, this relationship is not thereby limited. In other words, in another unillustrated embodiment, the area of the forming platform may be equal to the area of the inner bottom of the tank.

Here, the control module 170 is configured to drive the forming platform 120 to dip into the forming material in liquid (not illustrated) of the tank 110 and drive the curing module 180 to cure the forming material in liquid between the forming platform 120 and the inner bottom 112 of the tank 110 to form a solidification layer (not illustrated). Here, the forming material in liquid is, for example, a photosensitive resin in liquid, and the curing module 180 is, for example, an ultraviolet irradiation light source that cures the photosensitive resin through ultraviolet irradiation to form the solidification layer. Afterwards, the elevating module 150 drives the forming platform 120 to rise relatively to the tank 110, and the rotation module 160 simultaneously drives the tank 110 to rotate, such that the solidification layer is peeled off the inner bottom 112 of the tank 110 and is formed on the forming platform 120. Repeating the foregoing steps, the multilayered solidification layer is stacked on a surface of the forming platform 110. The solidification layer is a cross-sectional layer shape of a final three-dimensional article. Accordingly, after a step of layer-by-layer stacking is completed, the desired three-dimensional article (not illustrated) is formed. In addition, through disposing a coating layer (not illustrated) such as polytetrafluoroethene (PTFE) and polydimethylsiloxane (PDMS) on the inner bottom 112 of the tank 110, a viscous force of the three-dimensional article or the solidification layer relative to the inner bottom 112 of the tank 110 is reduced, and the solidification layer or the three-dimensional article can be peeled off the inner bottom 112 more smoothly.

It shall be stated that in the drawing of the present embodiment, the forming material in liquid, the cured solidification layer, and the three-dimensional article are omitted. However, they can all be inferred from the existing art related to stereo lithography or digital light processing, and they do not affect the implementation of the present embodiment.

Specifically, as illustrated in FIG. 2, the rotation module 160 includes a power source 162 and a rotation platform 166, wherein the power source 162 is electrically connected to the control module 170, the rotation platform 166 is disposed on the body 130, and the tank 110 is disposed on the rotation platform 166. Here, the power source 162 is, for example, a motor, which is linked to the rotation platform 166, such that the power source 162 is controlled by the control module 170 and can drive the rotation platform 166 and the tank 110 thereon to rotate relatively to the body 130, as indicated by a curved double-headed arrow in FIG. 1.

In the present embodiment, the rotation module 160 further includes an annular gear 164 assembled under the rotation platform 166, such that the tank 110 can rotate simultaneously with the rotation platform 166 and the annular gear 164. Moreover, the power source 162 includes a gear-driving portion 162a coupled to the annular gear 164, such that the power source 162 can drive the annular gear 164 to rotate through the gear-driving portion 162a and achieve the effect of rotating the tank 110 relatively to the body 130. In other unillustrated embodiments, a pulley set may be introduced into the rotation module to achieve the same motion effect of driving the rotation platform to rotate.

Referring to FIG. 1 again, in the present embodiment, the elevating module 150 includes a rack 152, a guiding threaded rod 154, and a driving member 156, wherein the rack 152 and the guiding threaded rod 154 are disposed on the body 130 and are located at one side of the tank 110. The driving member 156 is disposed on the rack 152 and is elevatably disposed along the guiding threaded rod 154. The control module 170 is electrically connected to the driving member 156. The forming platform 120 is disposed on the driving member 156 to be elevated and lowered with the driving member 156 along the guiding threaded rod 154. Accordingly, the control module 170 can drive the forming platform 120 to move in or move out of the tank 110.

In addition, referring to FIG. 1 and FIG. 2 again, the supply module 140 of the present embodiment includes a container 144, a pump 142, and a transfer pipe 146, wherein the container 144 is used to contain the forming material in liquid for supply, the pump 142 electrically connected to the control module 170 is connected between the transfer pipe 146 and the container 144 to draw the forming material in liquid in the container 144 and inject it into the tank 110 through the transfer pipe 146. Here, the transfer pipe 146 has a pliable structure or a movable structure so that a user may move the transfer pipe 146 towards or away from the tank 110.

In light of the foregoing structural configuration and description, the formed solidification layer is peeled off by a shear stress through rotation of the tank 110. For example, if the three-dimensional article or the solidification layer is in a circular shape and a diameter thereof is 120 mm, when it is to be peeled off the inner bottom 112 of the tank 110, to achieve a mode of better efficiency, the control module 170 drives the rotation module 160 and the elevating module 150, such that the forming platform 120 can be elevated by 5 mm when a rotation angle of the tank 110 is 20 degrees. In other words, a slope of a spiral peeling procedure formed by the rotation module 160 and the elevating module 150 is 0.25 mm/degree.

Figure 4:
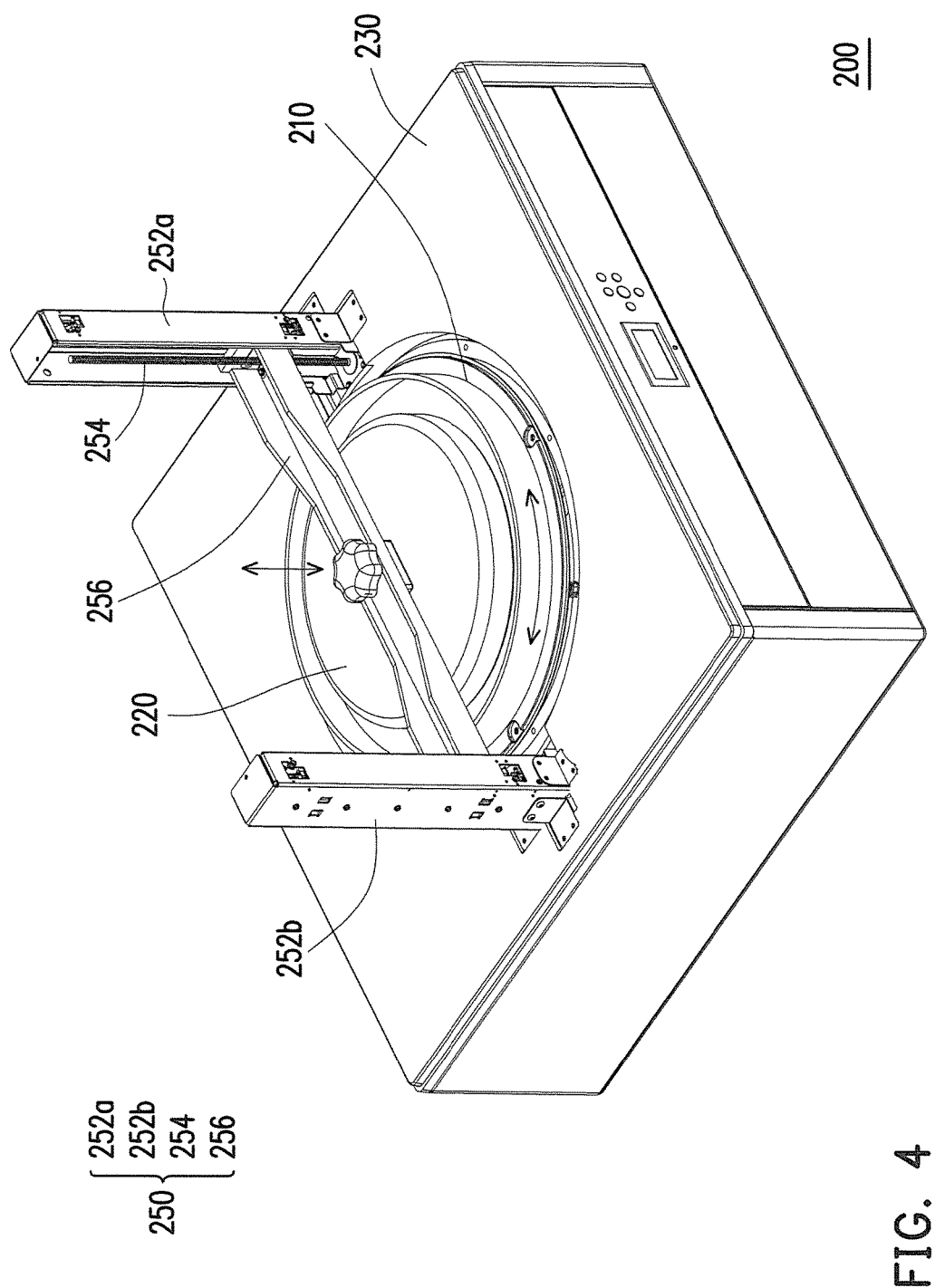
FIG. 4 is a schematic diagram illustrating a three-dimensional printing apparatus according to another embodiment of the disclosure.

FIG. 4 is a schematic diagram illustrating a three-dimensional printing apparatus according to another embodiment of the disclosure. Referring to FIG. 4, different from the foregoing description, in a three-dimensional printing apparatus 200 of the present embodiment, an elevating module 250 includes a pair of racks 252a, 252b, a pair of guiding threaded rods 254 (only one is illustrated due to the angle of view), and a driving member 256. Specifically, the racks 252a, 252b and the guiding threaded rods 254 are respectively disposed on the body 230 in pairs, and the tank 210 is located between the rack 252a, 252b and the guiding threaded rods 254. The driving member 256 is disposed between the racks 252a, 252b and is movably disposed along the guiding threaded rods 254. The control module (as element 170 described above) is electrically connected to the driving member 256. In the present embodiment, the racks 252a, 252b, the guiding threaded rods 254, and the driving member 256 form a gantry structure, which effectively enhances the strength and stability of the structure and allows better precision of motion when a forming platform 220 disposed on the driving member 256 is elevated and lowered relatively to the tank 210 (as indicated by a double-headed arrow in the drawing).

In summary of the foregoing embodiments, through the combination of the rotation module and the elevating module of the three-dimensional printing apparatus, the forming platform and the tank generate different actions that correspond to each other. When the solidification layer is to be peeled off, the forming platform is elevated relatively to the inner bottom of the tank, and the tank is simultaneously rotated, such that the solidification layer can be smoothly peeled off the inner bottom of the tank through the combination of both a shear force and a tensile stress and can be formed on the forming platform. In other words, rotating the tank prevents structural errors resulting from rotation of the forming platform and the solidification layer or the three-dimensional article thereon, and thereby enhances structural precision of the three-dimensional article.

Accordingly, when peeling off the solidification layer or the three-dimensional article, because of different action modes of the components, a component movement time in the three-dimensional printing processing can be effectively reduced, and efficiency of the overall manufacturing process is enhanced.

Lastly, it should be noted that the embodiments above are merely meant to describe the technical solutions of the disclosure rather than limit the disclosure. Although the embodiments above have described the disclosure in detail, any person skilled in the art shall understand that he or she may still make modifications to the technical solutions recited in the embodiments above or make equivalent replacements of part or all of the technical features therein. The modifications and replacements do not cause the nature of the corresponding technical solutions to depart from the scope of the technical solutions of the embodiments of the disclosure.

What is claimed is:

1. A three-dimensional printing apparatus comprising:
a body;
a rotation module disposed on the body;
a tank disposed on the rotation module to rotate relatively to the body, the tank being configured to contain a forming material in liquid;
an elevating module disposed on the body;
a forming platform disposed on the elevating module to be elevated and lowered relatively to the tank;
a curing module disposed in the body and located under the tank; and
a control module electrically connected to the rotation module, the elevating module, and the curing module,
wherein the control module drives the forming platform to dip into the forming material in liquid in the tank and drives the curing module to cure the forming material in liquid between the forming platform and an inner bottom of the tank to form a solidification layer, and
the control module drives the forming platform through the elevating module to rise relatively to the tank and simultaneously drives the tank to rotate through the rotation module to peel the solidification layer off the inner bottom of the tank and form on the forming platform; wherein the rotation module further comprises:
a power source electrically connected to the control module; and
a rotation platform disposed on the body, wherein the tank is disposed on the rotation platform, the power source is linked to the rotation platform, and the power source is controlled to drive the rotation platform and the tank thereon to rotate relatively to the body; and the rotation module further comprises:
an annular gear assembled under the rotation platform to rotate the tank simultaneously with the rotation platform and the annular gear, wherein the power source comprises a gear-driving portion coupled to the annular gear and the power source drives the annular gear to rotate through the gear-driving portion.

2. The three-dimensional printing apparatus according to claim 1, wherein the elevating module comprises:
a rack and a guiding threaded rod disposed on the body and located at one side of the tank; and
a driving member disposed on the rack and elevatably disposed along the guiding threaded rod, wherein the control module is electrically connected to the driving member, and the forming platform is disposed on the driving member to be elevated and lowered with the driving member along the guiding threaded rod.

3. The three-dimensional printing apparatus according to claim 1, further comprising:
a supply module disposed on the body and located beside the tank, the supply module containing the forming material in liquid to be supplied and injected into the tank.

4. The three-dimensional printing apparatus according to claim 3, wherein the supply module comprises:
a container containing the forming material in liquid; and
a pump and a transfer pipe, the pump being connected between the container and the transfer pipe to draw the forming material in liquid in the container and inject the forming material in liquid into the tank through the transfer pipe.

5. The three-dimensional printing apparatus according to claim 1, which is a stereo lithography apparatus or a digital light processing apparatus.

6. The three-dimensional printing apparatus according to claim 1, wherein the inner bottom of the tank is a plane.

7. The three-dimensional printing apparatus according to claim 1, wherein an area of the forming platform is smaller than or equal to an area of the inner bottom of the tank.

8. The three-dimensional printing apparatus according to claim 1, wherein the elevating module comprises:
a pair of racks and a pair of guiding threaded rods respectively disposed on the body, the tank being located between the pair of racks and the tank being located between the pair of guiding threaded rods; and
a driving member disposed between the pair of racks and movably disposed along the pair of guiding threaded rods, wherein the pair of racks, the pair of guiding threaded rods, and the driving member form a gantry structure, and the forming platform is disposed on the driving member.

* * * * *